United States Patent [19]

Nelson

[11] Patent Number: 4,870,125

[45] Date of Patent: Sep. 26, 1989

[54] COMPOSITION

[75] Inventor: Linda H. Nelson, Evansville, Ind.

[73] Assignee: General Electric Company, Mt. Vernon, Ind.

[21] Appl. No.: 318,403

[22] Filed: Mar. 3, 1989

Related U.S. Application Data

[62] Division of Ser. No. 136,786, Dec. 22, 1987, Pat. No. 4,826,193.

[51] Int. Cl.$^4$ .......................... C08K 5/01; C08L 81/06
[52] U.S. Cl. ................................. 524/490; 524/474; 524/491; 524/600; 524/611
[58] Field of Search ............... 524/490, 491, 474, 600, 524/611

[56] References Cited

U.S. PATENT DOCUMENTS

| | | | |
|---|---|---|---|
| 4,415,696 | 11/1983 | Merk | 524/490 |
| 4,626,566 | 12/1986 | Miller | 524/474 |
| 4,686,256 | 8/1987 | Boutin | 524/490 |
| 4,826,913 | 5/1989 | Nelson | 524/490 |

Primary Examiner—Morton Foelak
Attorney, Agent, or Firm—Martin B. Barancik

[57] ABSTRACT

Thermoplastic molding composition comprising an organic polyester or poly(phenylene oxide) of poly(phenylene sulfide) or poly(etherimide) polysulfone and a hydrogenated oligomer of an alpha-olefin in an amount effective to impart reliable and facile mold release.

8 Claims, No Drawings

COMPOSITION

This is a division of copending application Ser. No. 136,786, filled 12/22/87, now U.S. Pat. No. 4826193.

BACKGROUND OF THE INVENTION

Injection molding provides a convenient way for manufacturing various articles from thermoplastic resins, particularly objects of a relatively intricate nature. In order to injection mold articles in an economic manner, it is important to minimize the adhesion of the molded part to the mold surface through the use of an effective release agent. It is additionally advantageous that the release agent be incorporated in the material to be demolded. However, such an internal agent must be compatible with the resin; that is, its use should not lead to any significant loss of the other physical properties such as transparency, color and melt stability as measured by the usual characteristics of the resin under normal conditions and heat treatments.

It is well known to one skilled in the art that a particular internal release agent which is satisfactory for one type of thermoplastic resin may not be effective with another type. This is not surprising in view of the diversity of the chemical compositions of different thermoplastics. Thus, there is a continuing need to discover release agents that do not detract from the properties of virgin resin and yet provide efficient and reliably reproducible release at low concentrations.

Mineral oils are one type of mold release agents as described in K53,22556; K79,16559; K72,41093; K80,84353 and GB No. 2,077,742. Mineral oils are naturally occuring complex mixtures of hydrocarbons that are obtained from petroleum. U.S. Pat. No. 4,626,566 to Miller et al. describes and claims aromatic carbonate polymer compositions in admixture with a hydrogenated alpha olefin oligomer fluid as mold release agent.

SUMMARY OF THE INVENTION

I have now found that synthetic mineral oils derived from the oligomerization of aplha olefins followed by hydrogenation to remove unsaturation provide a surprising benefit over conventional mold release agents in organic polyesters, poly(arylene oxide)s, poly(arylene sulfide)s, poly(etherimide)s, and poly-sulfones without introducing significant detrimental effects on color, stability and other properties associated with these resins, all as more fully described hereinbelow.

DESCRIPTION OF THE INVENTION AND BEST MODE

This invention provides a composition comprising a thermoplastic resin selected from the group consisting of organic polyesters, poly(arylene oxide)s, poly-(arylene sulfide)s, poly(etherimide)s and polysulfones in admixture with a mold release effective amount of a hydrogenated alpha-olefin oligomer fluid. Although a wide range of alpha olefins and mixtures of olefins can be used to prepare hydrogenated alpha-olefin oligomeric fluids, the preferred alpha olefin is 1-decene.

Thermoplastic Resins

The thermoplastic resins useful in the present invention are synthetic polymers prepared by well known techniques that are available in the art.

The thermoplastic, organic polyester referred to herein is, structurally, the directly of indirectly formed condensation product of a dibasic organic acid and a glycol, and typically is a poly(alkylene phthalate). (Thermoplastic polycarbonates are not within the scope of the present invention.) Poly(butylene terephthalate), PBT, and poly(ethylene terephthalate), PET, are preferred structures. These preferred structures are useful in the virgin form in some instances as glass-filled modifications. Although the preferred thermoplastic polyester structure are at least semicrystalline, also contemplated as useful are amorphous structures such as poly (1,4 cyclohexylene-dimethylene terephthalate-co-isophthalate). PBT is characterized by its very rapid and extensive crystallization on injection molding at mold temperatures below 100° C., and by very good electrical and mechanical properties. The preparation and structure of PBT is disclosed, e.g., in U.S. Pat. Nos. 3,953,404; 4,020,122. U.S. Pat. No. 4,132,707 to Borman et al., discloses modified PBT structures. Unlike PBT, PET crystallizes slowly and at mold temperature well in excess of 100° C. Preferred forms of PET for use herein include better crystallizing modifications such as provided by inclusion of small amounts of glycols other than ethylene glycol in the structure as described in U.S. Pat. No. 4,086,212 and 4,136,089 to Bier et al, and/or the inclusion of nucleating agents as described in U.S. Pat. No. 4,212,791 to Avery et al, or other modifications as described in U.S. Pat. No. 4,215,032 to Kobayaski et al. All of the patents recited above are incorporated herein by reference as if fully set forth. Further background and description of the thermoplastic polyesters contemplated as useful herein may be found in Kirk-Othmer, *Encyclopedia of Chemical Technology*, Third Ed., Vol, III, pp 549–574, incorporated herein by reference. PET-type resins are commercially available from General Electric Company (VALOX), GAF Corporation (GAFITE) and Celanese Corporation (CELANEX).

The thermoplastic poly(arylene oxide)s useful in the present invention have the general structure:

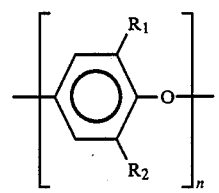

wherein either one or both of $R_1$ and $R_2$ may be hydrogen, methyl, methoxy, phenyl, or chlorine. The particularly preferred poly(arlene oxide) is poly(2,6-dimethyl-1,4-phenylene oxide) DMPPO. This polymer and many other structures may be prepared by oxidative coupling of 2, 6-disubstituted phenol in the presence of copper halide and one or more aliphatic amines or pyridine. DMPPO may also be prepared from 4-bromo-2,6-dimethylphenol in the presence of potassium hydroxide with a free-radical initiator. Kirk-Othmer's *Encyclopedia of Chemical Technology*, 3rd Ed., Vol. 18, pp 595–605 and pertinent references on pp 613–615 are incorporated herein by reference for further description of the manufacture and properties of the poly(phenylene oxide)s. The preparation and/or structure of poly(arylene oxide)s useful in this invention are also described in U.S. Pat. No. 4,576,842 to Hartsing et al., columns 7 to 12, incorporated herein by reference. DMPPO blended with polystyrene is commercially available from General Electric (NORYL ®).

The poly(arylene sulfide)s which are suitable for use herein are solid, have a melting point of at least about 150° F. and are insoluble in common solvents. Such resins can be conveniently prepared by the process disclosed in U.S. Pat. No. 3,354,129, for example. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylenesulfide).

The resulting polymer contains the aromatic nucleus of the polyhalo-substituted monomer coupled in repeating units predominantly through a sulfur atom. The polymers which are preferred for use according to this invention are those polymers wherein the arylene component is phenylene, biphenylene, naphthylene, or a lower alkyl-substituted derivative thereof. By lower alkyl is meant alkyl groups having one to six carbon atoms such as methyl, propyl, isobutyl, n-hexyl and the like.

The preparation and/or structure of poly(arylene sulfide)s useful in this invention is further described in U.S. Pat. No. 4,576,842 to Hartsing et al. at columns 26–27, incorporated herein by reference. The term poly(arylene sulfide) as used herein is meant to include not only homopolymers but also arylene sulfide copolymers, terpolymers and the like.

The particularly preferred poly(arylene sulfide) is poly(phenylene sulfide), a crystalline polymer with a characteristic repeat unit comprising a para-substituted benzene ring and a sulfur atom which may be described by the following formula, where n has a value of at least about 50.

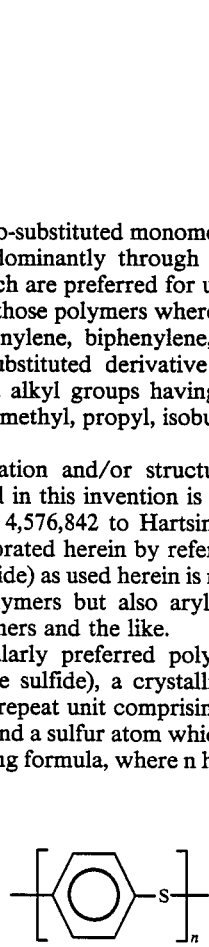

Poly(phenylene sulfide) compositions useful in this invention are available commercially from the Phillips Petroleum Company (RYTON).

The poly(etherimide)s useful herein may be formed by heating bisphenoxides with bisnitrophthalimides. The nitro group undergoes nucleophilic displacement with formation of an ether bond between reactants. Alternatively, the poly(etherimide)s may be prepared by reacting diamines with a dianhydride, as described in Kirk-Othmer, *Encyclopedia of Chemical Technology*, 3rd Ed., Vol. 18, pp 611–614 and references contained therein, incoporated herein by reference for background. The preparation and/or structure of poly(etherimide)s useful herein are described in U.S. Pat. No. 4,576,842 to Hartsing et al., columns 14 to 19; U.S. Pat. Nos. 3,847,867, 3,838,097 to Wirth et al.; U.S. Pat. No. 3,803,085 to Takekoshi et al.; 3,833,544; 3,887,588; 4,017,511; 3,965,125; and 4,024,111. Also U.S. Pat. No. 4,576,842 to Hartsing et al., columns 14 to 19, all incorporated herein by reference for description of preparation and structure of useful poly(etherimide)s.

The preferred poly(etherimide) has a structure incorporating the repeating unit

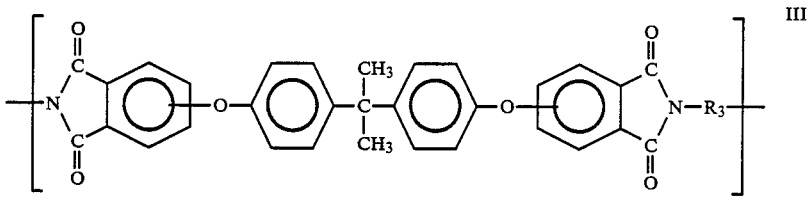

wherein $R_3$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbonatoms and $C_2$ to $C_8$ alkylene terminated polyorgano disiloxane or divalent unsubstituted or alkyl substituted diphenyl ether or diphenyl sulfide. Poly (etherimide)s are commercially available from General Electric (ULTEM®).

The poly(aryl sulfone) useful in this invention is a thermoplastic aromatic polymeric sulfone having the general structure.

wherein the —$R_3$— and —$R_4$— are predominantly aromatic. (A polysulfone formed by the copolymerization of olefins and sulfur dioxide, wherein —$R_3$— and —$R_4$— are aliphatic, is not within the ambit of the present invention).

One poly(aryl sulfone) useful in the present invention has the characteristic repeat unit

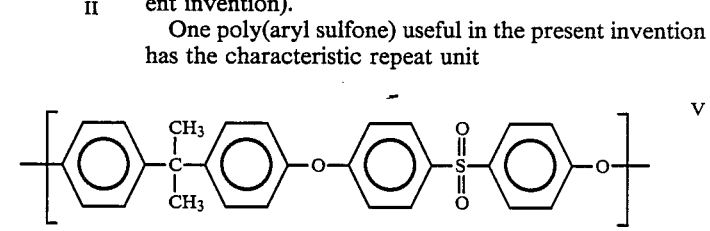

The preparation of this thermoplastic by condensing disodium bisphenol A with 4,4'-dichlorodiphenyl sulfone is described by R. N. Johnson, et al. *J. Polymer Science Part A*-1, Vol. 5, p 2376 (1967) herein incorporated by reference. Molecular weight is controlled by incorporation of an end-capping compound such as sodium phenate. Poly(aryl sulfone)s of the foregoing general structure are commercially available from Amoco (UDEL®).

British Pat. No. 1,060,546 incorporated herein by reference describes the preparation of an aromatic polysulfone having the structure

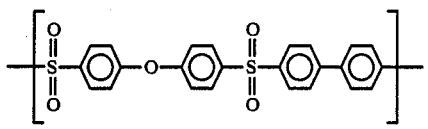    VI

This structure may be prepared by reacting diphenyl ether-4-4'-disulfonyl chloride with diphenyl in the presence of a Friedel-Crafts catalyst.

U.S. Pat. No. 4,008,203 incorporated herein by reference describes the preparation of a poly(aryl-sulfone), which may be formed by reacting 4,4'-dihydroxydiphenylsulfone with the corresponding dichloro compound and NaOH, having the structure

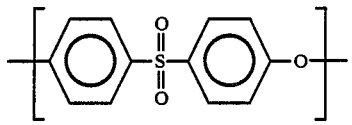    VII

Such polymers are commercially available from ICI Americas, Inc. (VICTREX).

Another useful poly(arl sulfone) is that having the structure

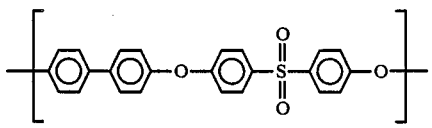    VIII

The preparation and/or structure of other poly(aryl sulfone)s is described in U.S. Pat. No. 4,576,842 to Hartsing et al., columns 3-7, incorporated herein by reference. Such material is commercially available from Union Carbide Corp. (RADEL).

Oligomer Fluid

The hydrogenated alpha-olefin oligomer fluids useful in this invention are derived from the oligomerization of 1-olefins through a catalytic reaction followed by hydrogenation to remove residual unsaturation. Examples of such catalysis include: cationic catalysis, see J. A. Breenan, Ind. Eng. Chem. Prod. Res. Div. (1980) 19, 2; Ziegler catalysis, see D.H. Antonsen et al, Ind. Eng. Chem. Prod. Res. Div. (1963), 2, 224; or metathesis catalysis, see W.T. Nelson et al, Ind. Eng. Chem. Prod. Res. Div., (1983), 22, 178 and references therein. Methods of preparation are also disclosed in U.S. Pat. Nos. 4,282,392; 4,225,739; 4,319,065; 4,311,864; 4,334,113 and 4,409,415 and references therein.

The product of oligomerization/hydrogenation is a mineral oil with fluidity over a wide temperature range. The product generally is a mixture of oligomers of various degrees of polymerization, branching and isomerization depending on the nature of the catalyst and olefin used and any subsequent product fractionation such as by distillation. A product structure representative of this type of oligomerization is 9-methyl-11-n-octyl heneicosane. Normal alpha olefins of 6-12 carbon atoms are preferred for the preparation of synthetic fluids, with 1-decene being most common. The oligomers are generally separated into various mixtures of dimer, trimer, tetramer and pentamer to achieve varying degrees of volatility, viscosity and viscosity index. The preferred saturated alpha-olefin oligomer fluids for this invention are those with a kinematic viscosity of approximately 2-8 CSt at 100° C. as determined by ASTM D445. Such oligomer fluids are commercially available from Emery Industries, and are known as Emery 3002, Emery 3004 and Emery 3006. The approximate composition of these fluids, as determined by gas chromatography, is shown below.

|      | DI-MER | TRI-MER | TETRA-MER | PENTA-MER | AVG. # CARBONS |
|------|--------|---------|-----------|-----------|----------------|
| 3002 | 100%   | —       | —         | —         | 20             |
| 3004 | —      | 89      | 11        | —         | 31             |
| 3006 | —      | 29      | 62        | 9         | 38             |

Alternatively, the Synfluids manufactured by Gulf Oill Corporation also may be used.

An effective mold releasing amount of the material of the invention is employed in the thermoplastic composition. Any amount of material which reduces the amount of pressure needed to eject the article from the injection mold and obtain a substantially unblemished article in comparison to the pressure needed to eject the thermoplastic composition control is an effective mold releasing amount. In general, effective amounts of the material are from about 0.01 to about 1.0 weight percent, based on the quantity of thermoplastic resin present, preferably form about 0.05 to about 0.5 weight percent. The material can be added to the resin in the normal manner that the other additives are added and coextruded. Depending upon the volatility of the compound at common processing and extrusion temperatures, an excess may be initially employed in the composition. For the purposes of this invention, the saturated alpha-olefin oligomer fluids can also be blended with other lubricants such as the synthetic and naturally occurring polyol esters.

Other common additives for thermoplastic resins may also be employed. For example, stabilizers such as epoxides may be employed as well as agents which are flame retardants, drip inhibitors, ductility enhancers, antioxidants, solvent resistance enhancers, ultraviolet light stabilizers, colorants and various inert fillers. Impact modifiers may also be present in the composition.

EXAMPLES

Below are specific examples of the invention. The examples are intended to illustrate but not narrow the inventive concept.

The mold release agent was dry formulated into the resins at the concentrations shown in each example.

Mold release effectiveness was determined in an injection molding machine with a 4 ounce shot capacity. The part molded was a 3"by 3" center-gated box tool wtih a 1½" wall height and ⅛" thick walls. It had ejector pins at four corners with two of the pins being attached to strain gauge transducers for measuring the part ejection pressure. The mold was designed with very little draft so that the part would tend to stick to the core unless mold release is used. In all tests a ¼" cushion was used, a 10 second injection time, and a 30 second cure time. The male half of the mold was supplied with cooling water. The temperature of the melt was 500° F. in Examples 1-3; 600° F. in Examples 4-6; 650° F. in Examples 7-8; 620° F. in Example 9 and 675° F. in Examples 10 and 11. The female mold temperature was 150° F. in Examples 1–3; 180° F. in Examples 4–8; and 200° F. in Examples 9–11.

The Kasha Index (KI) was measured to determine the effect of the release agents on the melt stability of the resin. The KI of a resin is a measurement of its melt viscosity and is obtained in the following manner: 7 grams of resin, dried a minimum of 90 minutes at 125° C., are added to a modified Tinius-Olsen model T3 melt indexer; the temperature in the indexer is maintained at 300° C. and the resin is heated at this temperature for 6 or 12 minutes. After 6 or 12 minutes, the resin is forced through a 0.04125 inch radius orifice using a plunger of radius 0.01865 inch and an applied force of 17.7 lbs. The time required for the plunger to travel two inches is measured in centiseconds; that is reported as the KI. For a given resin compounded with a series of different additives, the most melt stable additive (i.e. the additive which reduces the melt viscosity of the resin the least) will display the highest KI.

EXAMPLES 1–3

The thermoplastic polymer used in these examples was VALOX® 315, a polyester having as characteristic repeating unit 1,4-butylene terephthalate.

| | EXAMPLE NO. | | |
|---|---|---|---|
| | 1 | 2 | 3 |
| MATERIAL (wt %) | | | |
| Polyester | 99.85 | 99.65 | 99.65 |
| Petroleum wax-PE[1] | — | 0.2 | — |
| Antioxidant[2] | 0.15 | 0.15 | 0.15 |
| Emery 3004[3] | — | — | 0.2 |
| RELEASE PRESSURE, psi | | | |
| Right Pin | Breakthru, | 2915 | 3225 |
| Left Pin | no Release[4] | 1798 | 1943 |
| STANDARD DEVIATION | | | |
| Right Pin | — | 920 | 733 |
| Left Pin | — | 566 | 431 |
| KASHA INDEX | | | |
| Pellets (6 min) | 7764 | 6990 | 7740 |
| Pellets (10 min) | 7129 | 6579 | 6313 |
| Dwelled Part (6 min) | 503 | 584 | 509 |

[1]Petroleum wax/Polyethylene (Dura Commodities Corp.)
[2]Inorganox 1075 (Ciba Geigy)
[3]Hydrogenated alpha olefin oligomer (Emery Chem.Co.)
[4]At over 14,000 psi

EXAMPLES 4–6

The thermoplastic polymer used in these examples was a polyphenylene oxide (PPO) manufactured by General Electric having the repeating unit

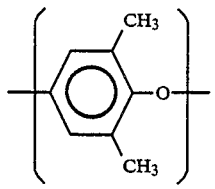

| | EXAMPLE NO. | | |
|---|---|---|---|
| | 4 | 5 | 6 |
| MATERIAL (gms) | | | |
| Poly(phenylene oxide) | 100 | 100 | 100 |

| | EXAMPLE NO. | | |
|---|---|---|---|
| | 4 | 5 | 6 |
| Pentaerythritol Tetrastearate | — | 0.4 | — |
| Emery 3004 | — | — | 0.4 |
| RELEASE PRESSURE, psi | | | |
| Right Pin | Breakthru, | 11014 | 2738 |
| Left Pin | no Release[4] | 12514 | 4900 |
| STANDARD DEVIATION | | | |
| Right Pin | — | 276 | 417 |
| Left Pin | — | 376 | 239 |

EXAMPLES 7–8

The thermoplastic polymer used in these examples was ULTEM®1000, a poly(etherimide) manufactured by General Electric wherein $R_3$ is m-phenylene.

| | EXAMPLE NO. | |
|---|---|---|
| | 7 | 8 |
| MATERIAL (gms) | | |
| Poly(etherimide) | 100 | 100 |
| Emery 3004 | — | 0.5 |
| RELEASE PRESSURE, psi | | |
| Right Pin | Breakthru, | 1312 |
| Left Pin | no Release[4] | 4125 |
| STANDARD DEVIATION | | |
| Right Pin | — | 83 |
| Left Pin | — | 219 |

EXAMPLES 9–11

The thermoplastic polymer used in these examples was UDEL P 1700, a polysulfone manufactured by Union Carbide and shown in FIG. V.

| | EXAMPLE NO. | | |
|---|---|---|---|
| | 9 | 10 | 11 |
| MATERIAL (gms) | | | |
| Polysulfone | 100 | 100 | 100 |
| Pentaerythritol Tetrastearate | — | 0.3 | — |
| Emery 3004 | — | — | 0.3 |
| RELEASE PRESSURE, psi | | | |
| Right Pin | Breakthru | 2666 | 820 |
| Left Pin | no Release[4] | 5244 | 3750 |
| STANDARD DEVIATION | | | |
| Right Pin | — | 781 | 103 |
| Left Pin | — | 368 | 165 |

The foregoing examples illustrate the advantageous mold release properties of the compositions containing the hydrogenated oligomer fluid. The compositions of this invention all show either a markedly reduced release pressure, which bears on the property of ease of release, or a reduced standard deviation, which bears on expected scatter of results and therefore consistency of performance. One or both of these advantages accrue without significant detriment to color or melt stability of the compositions.

What is claimed is:

1. A composition comprising a poly(etherimide) thermoplastic resin, and a mold release effective amount of a fluid hydrogenated oligomer of an alpha olefin.

2. The composition described in claim 1 wherein said thermoplastic resin is a poly(etherimide).

3. The composition described in claim 2 wherein said poly(etherimide) has the characteristic repeating unit

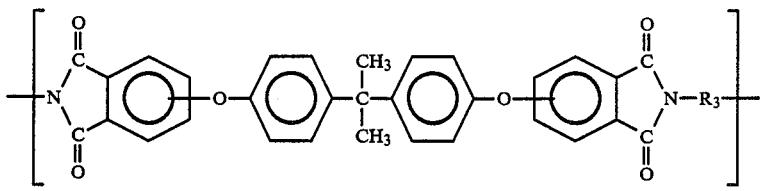

wherein R₃ is as defined in the specification.

4. The composition described in claim 1 wherein said release agent is a fluid hydrogenated oligomer of 1-decene and said amount is from about 0.01 to about 1.0 weight percent of said thermoplastic resin.

5. The composition described in claim 2 wherein said release agent is a fluid hydrogenated oligomer of 1-decene and said amount is from about 0.1 to about 1.0 weight percent of said thermoplastic resin.

6. The composition described in claim 3 wherein said release agent is a fluid hydrogenated oligomer of 1-decene and said amount is from about 0.1 to about 1.0 weight percent of said thermoplastic resin.

7. The composition in accordance with claim 1 wherein the oligomer is from about 0.05 to about 1.0 weight percent of the thermoplastic resin.

8. The composition in accordance with claim 7 wherein the oligomer is from about 0.05 to 0.5 weight percent of the thermoplastic resin.

* * * * *